(12) United States Patent
Agrawal et al.

(10) Patent No.: US 8,510,787 B2
(45) Date of Patent: Aug. 13, 2013

(54) ACCESS NODE CAPABLE OF DYNAMIC CHANNEL CACHING

(75) Inventors: Anshul Agrawal, Plano, TX (US); Bill Krogfoss, Frisco, TX (US); Lev Sofman, Plano, TX (US)

(73) Assignee: Alcatel Lucent, Paris (FR)

( * ) Notice: Subject to any disclaimer, the term of this patent is extended or adjusted under 35 U.S.C. 154(b) by 1281 days.

(21) Appl. No.: 11/311,081

(22) Filed: Dec. 19, 2005

(65) Prior Publication Data
US 2007/0143808 A1 Jun. 21, 2007

(51) Int. Cl.
*H04N 7/173* (2011.01)

(52) U.S. Cl.
USPC ............ 725/127; 725/91; 725/92; 725/93; 725/95; 725/119

(58) Field of Classification Search
USPC .................................. 725/1–145; 348/748
See application file for complete search history.

(56) References Cited

U.S. PATENT DOCUMENTS

| | | | |
|---|---|---|---|
| 6,418,473 B1 | 7/2002 | St. Maurice et al. | |
| 6,446,261 B1 * | 9/2002 | Rosser | 725/34 |
| 6,651,089 B1 | 11/2003 | Stead | |
| 6,718,552 B1 * | 4/2004 | Goode | 725/95 |
| 6,909,726 B1 | 6/2005 | Sheeran | |
| 7,284,256 B2 * | 10/2007 | Candelore et al. | 725/46 |
| 7,809,010 B2 * | 10/2010 | Mehta et al. | 370/432 |
| 2001/0014975 A1 * | 8/2001 | Gordon et al. | 725/91 |
| 2002/0194607 A1 | 12/2002 | Connelly | |
| 2003/0093792 A1 * | 5/2003 | Labeeb et al. | 725/46 |
| 2003/0200548 A1 * | 10/2003 | Baran et al. | 725/90 |
| 2003/0217365 A1 * | 11/2003 | Caputo | 725/95 |
| 2004/0117816 A1 | 6/2004 | Karaoguz et al. | |
| 2004/0143850 A1 * | 7/2004 | Costa | 725/115 |
| 2006/0020995 A1 * | 1/2006 | Opie et al. | 725/117 |
| 2006/0037040 A1 * | 2/2006 | Mahalick et al. | 725/32 |
| 2006/0075428 A1 * | 4/2006 | Farmer et al. | 725/38 |
| 2006/0222323 A1 * | 10/2006 | Sharpe et al. | 386/68 |
| 2007/0248165 A1 * | 10/2007 | Boyce et al. | 375/240.02 |
| 2008/0205435 A1 * | 8/2008 | Nahumi et al. | 370/463 |

FOREIGN PATENT DOCUMENTS

| | | |
|---|---|---|
| CN | 1703087 A | 11/2005 |
| EP | 1601199 A1 | 11/2005 |
| EP | 1 806 927 A | 7/2007 |
| EP | 1 523 190 A1 | 4/2008 |
| WO | 00/64174 A1 | 10/2000 |
| WO | 01/91474 A2 | 11/2001 |
| WO | 03/053056 A1 | 6/2003 |
| WO | 2005/112465 A1 | 11/2005 |

OTHER PUBLICATIONS

Digisoft.Tv "Interactive Television Applications: Zap-Tracking™" http://www.digisoft.tv/products/ zaptracking.html, copyrighted 2004, pp. 1-8.

(Continued)

*Primary Examiner* — Chris Parry
*Assistant Examiner* — Gigi L Dubasky
(74) *Attorney, Agent, or Firm* — Capitol Patent & Trademark Law Firm, PLLC

(57) ABSTRACT

An access node (e.g., DSLAM) is described herein which can limit bandwidth usage in a transport network by incorporating an enhanced rapid TV channel changing functionality/enhanced BTV server in which TV channels from a multicast TV stream are dynamically selected based on past TV channel clicking statistics and then stored therein so there is a good chance that it can respond to a TV channel change request from a STB.

10 Claims, 5 Drawing Sheets

OTHER PUBLICATIONS

EPO Search Report for EP Application No. 06024690.7 dated Apr. 2, 2008.
Search Report dated Mar. 5, 2008, issued in European Patent Application No. 06024690.7.

Rejaie et al., Multimedia Proxy Caching Mechanism for Quality Adaptive Streaming Applications in the Internet, IEEE Infocom 2000, pp. 980-988, XP-001042813.

* cited by examiner

US 8,510,787 B2

ACCESS NODE CAPABLE OF DYNAMIC CHANNEL CACHING

CROSS REFERENCE TO RELATED APPLICATION

This application is related to a co-assigned U.S. patent application Ser. No. 11/311,046 filed concurrently herewith and entitled "Rapid Media Channel Changing Mechanism and Access Network Node Comprising Same". The contents of this document are incorporated by reference herein.

BACKGROUND OF THE INVENTION

1. Field of the Invention

The present invention is related to an access node (e.g., DSLAM) that incorporates an enhanced rapid TV channel changing functionality/enhanced BTV server which dynamically selects a set of TV channels from a multicast TV stream using past TV channel clicking statistics and then stores the selected TV channels so it can respond to a TV channel change request that is subsequently received from an attached STB.

2. Description of Related Art

The following abbreviations are herewith defined, at least some of which are referred to in the ensuing description of the prior art and the present invention.

BTV Broadcast Television
BW Bandwidth
CO Central Office
CPE Customer Premises Equipment
DSL Digital Subscriber Line
DSLAM Digital Subscriber Line Access Multiplexer
HDTV High-Definition Television
HSI High Speed Internet
Mbps Mega-Bits-Per-Second
PIP Picture-in-Picture
RCC Rapid Channel Change
SDTV Standard Definition Television
STB Set-Top Box
TV Television
VHO Video Hub Office
VoD Video-on-Demand
VoIP Voice-over-Internet Protocol Telecommunication service providers plan to use a transport network to offer triple-play services, which include video (BTV), voice (telecommunications) and data (Internet) to homes via DSL phone lines. To accomplish this, the transport network needs to be able to provide a BTV service which has an effective rapid TV channel change functionality. Because, if it does not, when a user who is watching TV decides to change the TV channel then that person will likely experience an undesirable delay before the new TV channel is displayed on their TV. Several solutions have been offered to help address this TV channel changing latency problem. One of these solutions is described next with respect to FIG. 1 (PRIOR ART).

Referring to FIG. 1 (PRIOR ART), there is a block diagram illustrating the basic components of a traditional transport network 100. As shown, the traditional transport network 100 includes a VHO 102, a CO 104, an access node/DSLAM 106 (one shown) and STBs 108. In operation, the VHO 102 multicasts a set of TV channels 109 via the CO 104 and access node 106 to the STBs 108. Then, a user interfaces with their STB 108 (e.g., STB 108a) and selects one of the multicast TV channels 109 to watch on their TV (not shown). The user may want to watch another TV channel after a period of time and when this happens they input a TV channel change request 107 into their STB 108a. The STB 108a forwards the TV channel change request 107 to the VHO 102. Upon receiving the TV channel change request 107, the VHO 102 and in particular the rapid TV channel change functionality 110 therein unicasts the requested TV channel 111 directly to that STB 108a.

This solution enhances the television viewing experience by enabling a user to rapidly switch TV channels. However, a main drawback of this solution is that a large amount of bandwidth on a feeder link 112 (which also transmits PiP, VoD, VoIP and HSI traffic) between the CO 104 and the access node 106 is needed to unicast TV channels 111 to individual STBs 108. The bandwidth on a link 114 between the VHO 102 and CO 104 is also increased. To help alleviate this problem, the access node 106 can be configured to implement its own rapid TV channel change functionality as described next with respect to FIG. 2.

Referring to FIG. 2, there is a block diagram illustrating the basic components of a transport network 200 which has an access node 206 that is configured to implement a rapid TV channel change functionality 210 as described in the co-assigned/co-filed U.S. patent application Ser. No. 11/311,046. As shown, the transport network 200 includes a VHO 202, a CO 204, an access node/DSLAM 206 (one shown) and STBs 208. In operation, the VHO 202 multicasts a set of TV channels 209 via the CO 204 and access node 206 to the STBs 208. The access node 206 implements a rapid TV channel changing functionality 210 (integrated BTV server(s) 210) which: (1) stores "popular" TV channels 211a selected from the multicast TV channels 209; and (2) unicasts one of the stored "popular" TV channels 211a to a particular STB 208 (e.g., STB 208a) in response to receiving a TV channel change request 207 (e.g., TV channel change request 207a) from that STB 208a. It is not practical for the rapid TV channel changing functionality 210 to store all of the multicast TV channels 209.

The integration of a rapid TV channel change functionality 210 within the access node 206 effectively reduces a substantial amount of bandwidth on the feeder link 212 between the CO 204 and the access node 206. This reduction of bandwidth on the feeder link 212 can save a telecommunications service provider millions of dollars in transport costs a year. However, if the access node 206 has not stored a TV channel 211b which is requested by a STB 208 (e.g., STB 208b) via an incoming TV channel change request 207 (e.g., TV channel change request 207b), then the access node 206 needs to forward the TV channel change request 207b to the VHO 202. Thereafter, the VHO 202 and in particular a rapid TV channel change functionality 214 therein needs to unicast the requested TV channel 211b directly to that particular STB 208b. If this happens, then additional bandwidth will be used on the feeder link 212 between the CO 204 and the access node 206. The use of additional bandwidth on the feeder link 212 is not desirable. As such, it is important that the access node 206 and in particular the rapid TV channel change functionality 210 therein determines and stores the "right" TV channels to minimize the need to forward a TV channel change request 207b to the VHO 202. This need and other needs are satisfied by the present invention.

BRIEF DESCRIPTION OF THE INVENTION

The present invention includes an access node (e.g., DSLAM) which can limit bandwidth usage in a transport network by incorporating an enhanced rapid TV channel changing functionality/enhanced BTV server which dynamically selects a set of TV channels from a multicast TV stream using past TV channel clicking statistics and then stores the selected TV channels so it can respond to a TV channel change request that is subsequently received from an attached STB. In one embodiment, the access node can provide broadcast TV channels to STBs by: (a) multicasting TV channels to STBs; (b) collecting data during a sliding time period about how many times each TV channel was activated by STBs; (c) dynamically determining based at least in part on the collected data a set of "right" TV channels that are likely to be activated in the future by one or more of the STBs; (d) storing the set of "right" TV channels; and (e) upon receiving a TV channel change request from one of the STBs, unicasting the corresponding stored TV channel to that particular STB. Several different ways are described herein about how the access node and in particular the enhanced rapid TV channel changing functionality/enhanced BTV server can dynamically determine and store the "right" TV channels so there is a good chance it can respond to a TV channel change request from a STB.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
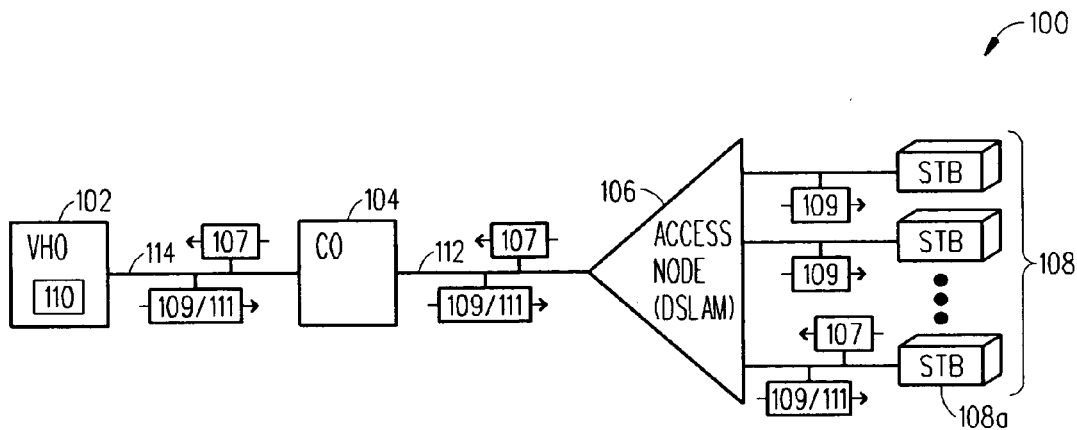
FIG. 1 (PRIOR ART) is a block diagram that illustrates the basic components of a traditional transport network.
Figure 2:
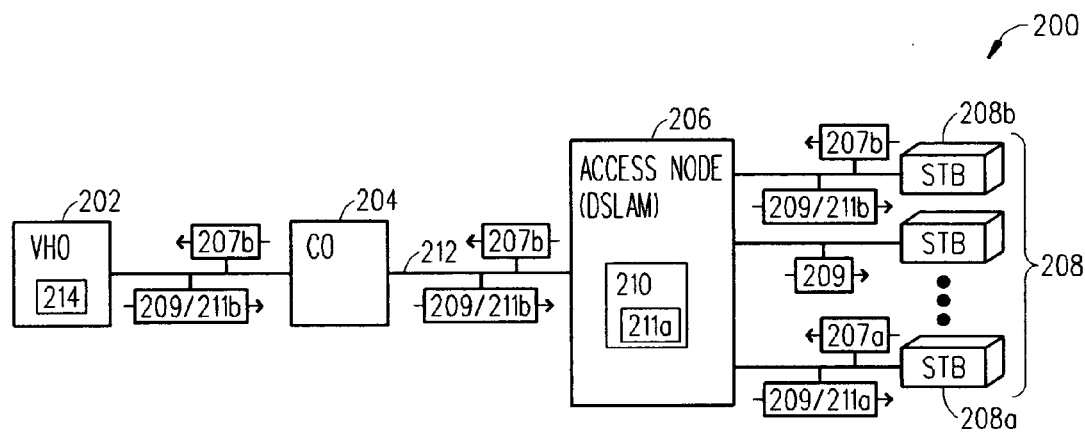
FIG. 2 is a block diagram that illustrates the basic components of a transport network which has an access node that incorporates a rapid TV channel change functionality (BTV server) which stores "popular" TV channels as described in the co-assigned/filed U.S. patent application Ser. No. 11/311,046.

Referring to FIGS. 3-9, there are several drawings/flowcharts which are used to help explain how an access node 306 can limit the bandwidth usage in a transport network 300 by incorporating an enhanced rapid TV channel changing functionality 310 (enhanced integrated BTV server 310) which dynamically selects and stores the "right" TV channels 311a so it likely can respond to a TV channel change request 307 from a STB 308. First, a brief explanation is provided below about the basic components and functionalities of the transport network 300 and access node 306. Then, a detailed description is provided below about several different ways the access node 306 and in particular the enhanced rapid TV channel changing functionality 310 therein can dynamically select the "right" TV channels 311a which it should store so it can more likely than not respond to a TV channel change request 307 from anyone of the STBs 308.

Figure 3:
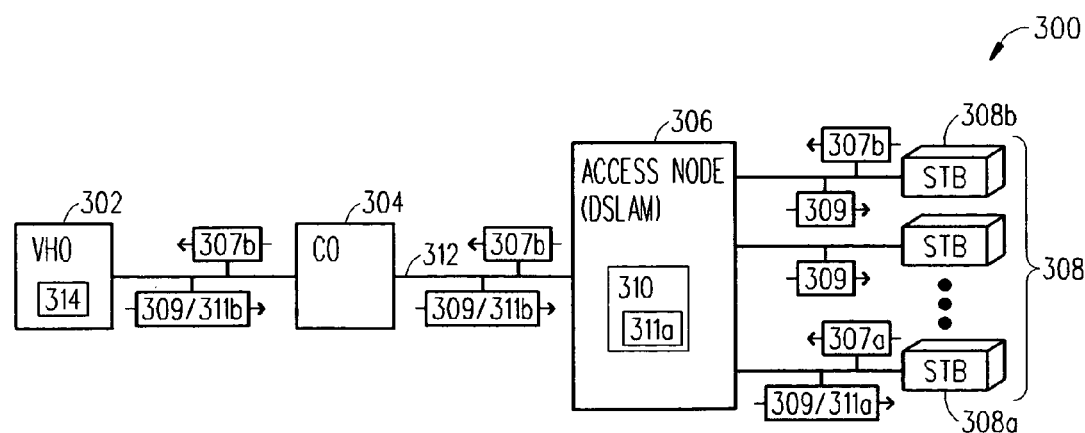
FIG. 3 is a block diagram that illustrates the basic components of a transport network which has an access node that incorporates an enhanced rapid TV channel change functionality (enhanced BTV server) which selects and stores the "right" TV channels in accordance with the present invention.

Referring to FIG. 3, there is a block diagram illustrating the basic components of a transport network 300 which has an access node 306 therein that incorporates the enhanced rapid TV channel change functionality 310 in accordance with the present invention. As shown, the transport network 300 includes a VHO 302, a CO 304, an access node/DSLAM 306 (one shown) and STBs 308. In operation, the VHO 302 multicasts a set of TV channels 309 via the CO 304 and access node 306 to the STBs 308. And, the access node 306 incorporates an enhanced rapid TV channel changing functionality 310 (enhanced BTV server(s) 310) which: (1) determines and stores the "right" TV channels 311a selected from the multicast TV channels 309; and (2) unicasts one of the stored "right" TV channels 311a to a particular STB 308 (e.g., STB 308a) in response to receiving a TV channel change request 307 (e.g., TV channel change request 307a) from that STB 308a. Again, it is not practical for the rapid TV channel changing functionality 310 to store all of the multicast TV channels 309.

The integration of an enhanced rapid TV channel change functionality 310 within the access node 306 effectively reduces a substantial amount of bandwidth on the feeder link 312 between the CO 304 and the access node 306. However, if the access node 306 has not stored a TV channel which is requested by a STB 308 (e.g., STB 308b) via an incoming TV channel change request 307 (e.g., TV channel change request 307b), then the access node 306 needs to forward the TV channel change request 307b to the VHO 302. Thereafter, the VHO 302 and in particular a rapid TV channel change functionality 314 therein needs to unicast the requested TV channel 311b directly to that particular STB 308b. If this happens, then additional bandwidth will be used on the feeder link 312 between the CO 304 and the access node 306. The use of additional bandwidth on the feeder link 312 is not desirable. As such, it is important that the access node 306 and in particular the rapid TV channel change functionality 310 determines and stores the "right" TV channels 311a to minimize the need to forward a TV channel change request 307b to the VHO 302. The present invention does this as described next.

Figure 4:
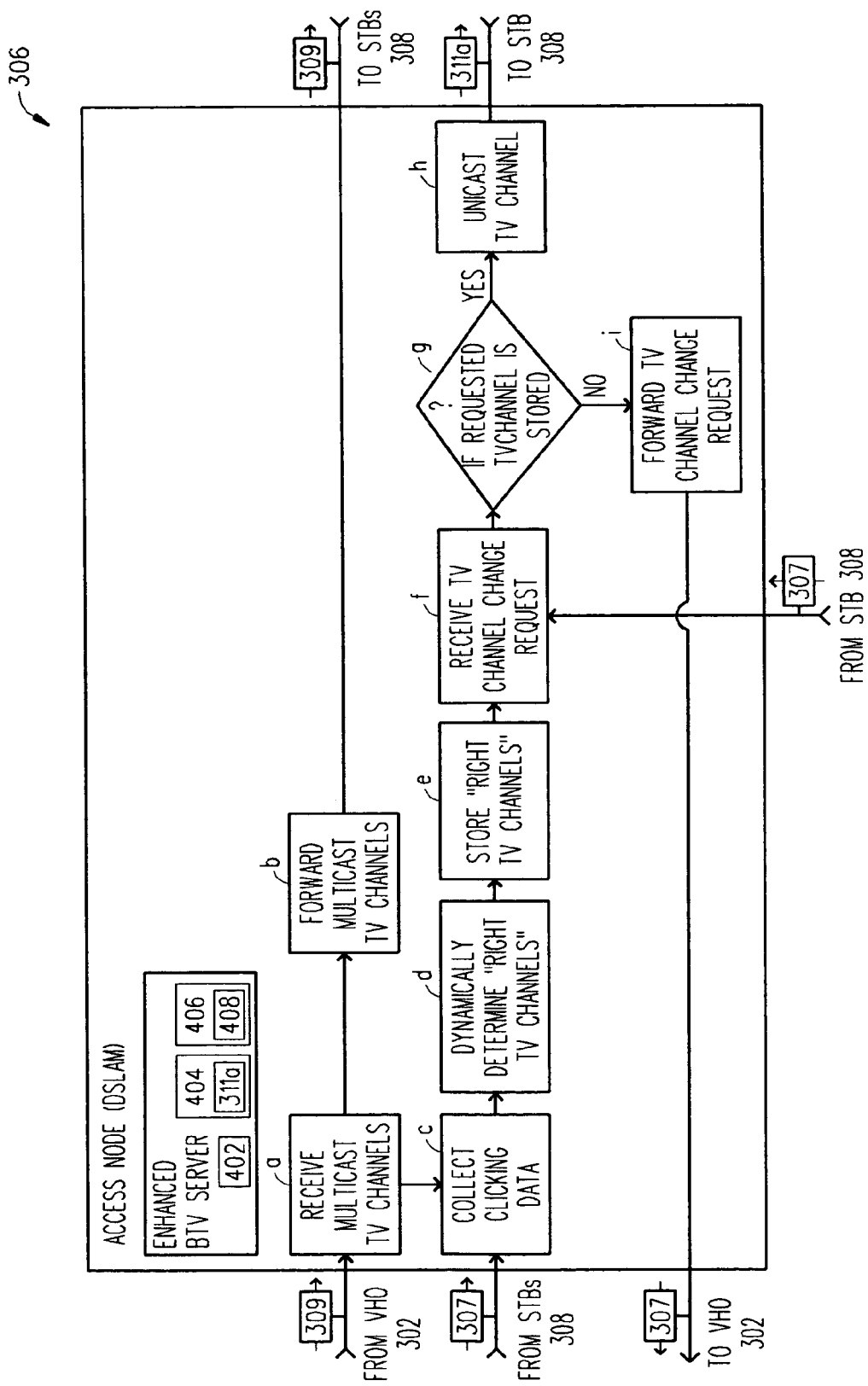
FIG. 4 is a diagram that is used to help explain how the access node can provide multicast TV channels and unicast TV channels to STBs in accordance with the present invention.

Referring to FIG. 4, the basic components and functionality of the access node 306 in accordance with the present invention are illustrated. As shown, the access node 306 includes one or more BTV servers 310 each of which has a processor 402, a buffer 404, and a memory 406 which stores instructions 408 for carrying out the enhanced rapid TV channel change functionality. The instructions 408 are accessible from within the memory 406 and are processable by the processor 402 to perform the following operations: (a) receive multicasted TV channels 309 (from the VHO 302); (b) forward the multicast TV channels 309 to STBs 308; (c) collect data during a sliding time period about a number of activations (TV channel change requests 307) for each TV channel by STBs 308; (d) dynamically determine a set of "right" TV channels 311a that are likely to be activated in the future by one or more STBs 308; (e) store the set of "right" TV channels 311a in buffer 404; (f) receive a TV channel change request 307 from one of the STBs 308; (g) determine if the TV channel associated with the received TV channel change request 307 is stored in buffer 404; (h) if yes, then unicast the requested TV channel 311 (e.g. RCC traffic 311a) to the particular STB 308 (e.g., STB 308a); and (i) if not, then forward the TV channel request 307 to the VHO 302 which has its own rapid TV channel change functionality 314 (BTV server 314) that unicasts the requested TV channel 311b (e.g., RCC traffic 311b) to the particular STB 308 (e.g., STB 308b) (see FIG. 3). It should be noted that when the access node 306 (or VHO 302) unicasts a requested TV channel 311 to a particular STB 308, then that particular STB 308 will at a later time switch to and display the multicast version of the new TV channel on the user's TV. And, the access node 306 (or the VHO 302) at that point will stop the unicast of the new TV channel 311.

An important aspect of the present invention is related to how the access node 306 and in particular the enhanced BTV server 310 dynamically determines the "right" TV channels 311a which it should store in the buffer 404 so that it can more likely than not respond to a TV channel change request 307 from a STB 308. Basically, the enhanced BTV server 310 is programmed to convert learned TV channel change behavior into predictive TV channel selection. This is done by gathering statistics about user's channel clicking (or changing) behavior over a sliding time period and using the collected data to dynamically determine the "right" TV channels 311a which should be stored in the buffer 404 (see steps c-e in FIG. 4). In particular, rolling averages (over short and/or long terms) of TV channel clicks which are monitored at the access node 306 allows the enhanced BTV server 310 to better determine the "right" TV channels 311a. And, by dynamically determining the "right" TV channels 311a, the enhanced BTV server 310 can reduce the bandwidth usage on the feeder link 312 by minimizing the number of TV channel requests 307b that need to be serviced by the VHO 302 (see FIG. 3).

The following nomenclature is used hereafter to help explain how the "right" TV channels 311a are selected in accordance with the present invention:
Z: set of all multicast TV channels (including HD TV channels & SD TV channels).
Y: set of "locally" served TV channels (the "right" TV channels 311a).
X: set of "provisioned" TV channels. Typically, the X TV channels are manually pre-selected by the telecommunications service provider (see scenario in FIG. 6). However, the X TV channels can also be automatically selected by the enhanced integrated BTV server 310 (see scenario in FIGS. 8-9).
(Y-X): set of "swappable" candidate channels.
(Z-Y): set of "remotely" served channels.

Figure 5:
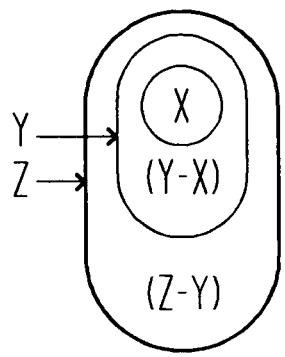
FIG. 5 is a diagram that is used to help explain one way how the enhanced rapid TV channel change functionality (enhanced BTV server) can classify the multicast TV channels into different sets in accordance with the present invention.
Figure 6:
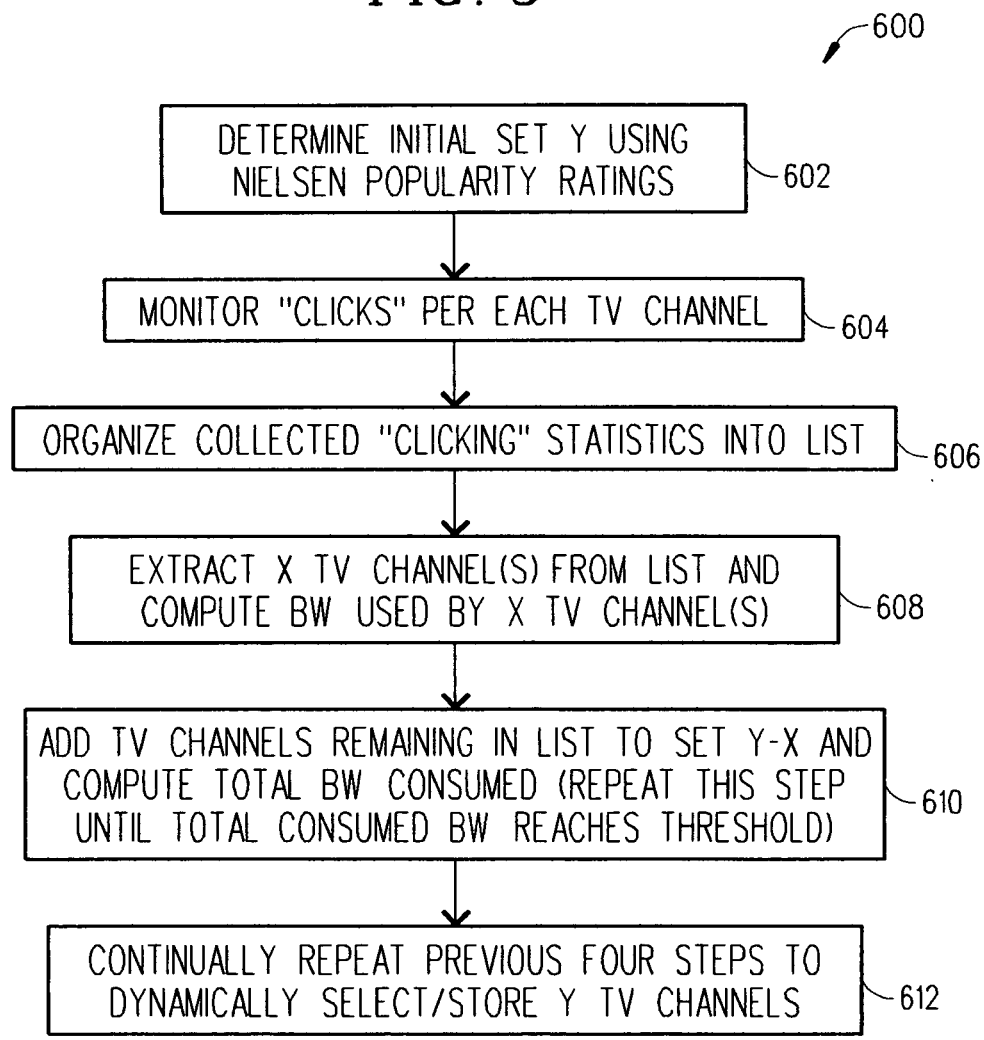
FIG. 6 is a flowchart illustrating an exemplary method that can be implemented by the enhanced rapid TV channel change functionality (enhanced BTV server) in accordance with a first scenario of the present invention.
Figure 7:
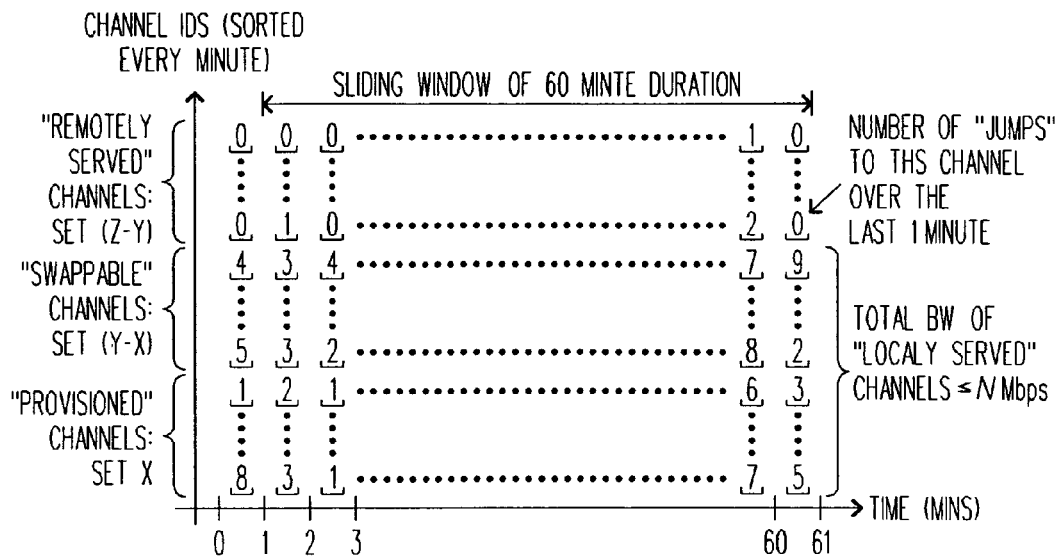
FIG. 7 is a diagram illustrating how clicking rates of TV channels can be monitored by the enhanced rapid TV channel change functionality (enhanced BTV server) in accordance with the present invention.

This nomenclature is graphically represented in FIG. 5. It is desirable to keep the BW(Y)≦N Mbps, where BW(Y)= BW (HDTV channels in Y)+BW (SDTV channels in Y) and where N is less than the capacity of feeder link 312. Ideally, all TV channel change requests 307 (RCC requests 307) would be for TV channels which are within set Y. If this happens, then the BW consumed on the feeder link 312 for BTV would remain fixed. But, when the RCC request 307 is for a TV channel within the set (Z-Y), then the BW consumed on feeder link 312 for BTV is increased. As can be seen, it is important to select the "right" TV channels 311a to be stored at the access node 306. One way the access node 306 can do this is by updating set X with pre-selected TV channels and then dynamically updating the set (Y-X) with the most actively "clicked on" TV channels. This can be done as follows (see FIG. 6):

1. Determine the initial set Y using a RCC frequency curve (see step 602 in FIG. 6). For instance, the RCC frequency curve can represent the most "popular" TV channels taking into account the TV channels codec rates and the Nielsen popularity ratings. The particular codec rate of a TV channel depends on whether the TV channel is a SDTV channel or a HDTV channel. Typically, a HD TV channel has a codec rate that consumes 3×-4× more BW than a SD TV channel.
2. Monitor the number of times each TV channel is clicked-on by all of the STBs 308 over a moving time window (see step 604 in FIG. 6). For example, over a moving time window of 1 hour, the number of clicks for each TV channel, could be sorted in descending order within a list as follows:
Channel 5: 300 clicks
Channel 11: 250 clicks
Channel 13: 104 clicks
.
.
.
FIG. 7 is a diagram that graphically illustrates one way that the clicking rates can be monitored for each TV channel. Typically, the number of clicks for each TV channel would be multiplied (weighted) by the ratio of their TV channel's BW to a SDTV channel.
3. Organize the collected "clicking" statistics within 1-minute buckets and use the most recent 60 buckets to compute a list for an hour (see step 606 in FIG. 6). If desired, more appropriate/optimal time values could be used. For instance, one could use 15-minute buckets instead of 1-minute buckets.
4. Extract all of the "provisioned" TV channels for set X from the list and then compute the total BW consumed by the X TV channels (see step 608 in FIG. 6).
5. From the remaining sorted list, add TV channels (from top to bottom) to set Y and calculate the total BW consumed (including BW consumed by X TV channels). This step is repeated until the total consumed BW reaches N Mbps (see step 610 in FIG. 6).
6. Continually repeat steps 2-5 in order to dynamically select and store the "right" TV channels 311a over a rolling time period (see step 612 in FIG. 6).

To prevent "thrashing" (swapping in & out of TV channels every minute) hysteresis could be introduced into the dynamic selection of Y-X TV channels. However, this is not necessarily required because the clicking rate represents a rolling average over a large time window, which inherently provides hysteresis.

The TV channels in the set (Y-X) may be swapped-out of set Y based on how infrequently they are selected (clicked on) by the STBs 308. And, several SD TV channels may need to be swapped-out of set Y when the new channel that is swapped-in is a HD TV channel. But, TV channels only need to be swapped-out if BW(Y)≧N Mbps.

A popular TV channel to which viewers are likely to stay tuned and not change, may not be selected to be in set Y, since the number of clicks over time will gradually drop to 0. This may be acceptable from the RCC BW point of view, because the popular TV channel is being served by the multicast BTV. On the other hand, this may not be acceptable since viewers are also more likely to tune in to the popular TV channel over a longer time period. A possible remedy is to include the popular TV channel in the set X (either manually as described above in FIG. 6 or automatically with the aid of a longer term statistic as described below in FIGS. 8-9). In an extreme scenario, if no one changes TV channels, then the channel clicking statistics could all go to zero, in which case the original set Y could simply be maintained (no change).

As can be seen, the present invention assumes that past clicking behavior is a good indicator of future clicking behavior. However, this assumption raises a question as to what time-scale is needed to accurately predict TV channel changing behavior. For instance, a short time-scale has the advantage of being more dynamically reactive to the user's TV channel changing pattern. And, a long time-scale has the advantage of being more accurate over the "long run".

To address this concern, one could use two time-scales to help achieve an accurate clicking frequency prediction which enables the enhanced BTV server 310 to store the "right" TV channels 311a. For instance, the enhanced BTV server 310 could use statistics collected over a short time-scale such as a 1-minute periods (aggregated hourly) to predict TV channel clicking popularity hourly. And, the most frequently clicked of these TV channels could be put into the "swappable" set (Y-X). Then, the enhanced BTV server 310 could use statistics collected over a long time-scale such as 1 day periods (one for each day of the week) cumulative over several weeks to predict daily TV channel clicking popularity. And, the most frequently clicked of these TV channels could be put into the provisioned set X. In this scenario, the provisioned set X includes TV channels that are both automatically (algorithm-initiated) placed and manually (telecommunication service provider-initiated) placed. Thus, the provisioned X TV channels are not necessarily permanent which means that the members of set X can change dynamically in the same manner as the members in set (Y-X), but not as frequently.

An example of this scenario is described next in which two time scales are used to select the "right" TV channels 311a. This example uses several different data structures to record various channel changing statistics based on "short" time intervals like hours and "long" time intervals like primetime hours during each day of the week. These data structures are defined as follows:

I. Let data structure $r(i)$ hold the ratio of BW required by channel i to that required by a SD channel i.e. $r(i)=1$ or (HD/SD).

II. Let data structure $m(i,j)$ hold the # of channel i clicks observed over minute j (see step 802 in FIG. 8).
i=1 to maximum # of TV channels, j=1 to 60 (assuming 1 hour sliding history).
At start of each minute, execute "left shift" operation such that $m(i,j-1)\leftarrow m(i,j)$ where j=2 to 60.
Record # of clicks observed in $m(i,60)$ for each channel i (and multiply by $r(i)$ for proper weighting).

III. Let data structure $h(i)$ hold the # of channel i clicks observed over the last hour (see step 804 in FIG. 8).
At end of each minute, for each channel i compute $h(i)=\Sigma m(i,j)\ \forall j$.
Sort $h(i)$ in descending order.

IV. Let data structure $w(i,d,t,j)$ hold the # of channel i clicks observed over the "primetime" hour t on the day d of the week j (see step 806 in FIG. 8).
d=1 to 7 (Monday to Sunday), t=5 pm, 6 pm, . . . 11 pm, j=1 to 6 (assuming 6 week sliding history).
At start of each week, execute "left shift" operation such that $w(i,d,t,j-1)\leftarrow w(i,d,t,j)$ where j=2 to 6.
Record # of clicks observed in $w(i,d,t,6)$ for each channel i, each day of the week d, at the end of each "primetime" hour t set $w(i,d,t-1,6)=h(i)$.

V. Let data structure $H(i,d,t)$ hold the # of channel i clicks observed over the "primetime" hour t on the day d over the last 6 weeks (see step 808 in FIG. 8).
At start of each week, before executing "left shift" operation above, compute $H(i,d,t)=\Sigma w(i,d,t,j)\ \forall j$.
For each day d, and each "primetime" hour t, sort $H(i,d,t)$ in descending order.

VI. Let data structure $x(i)$ indicate whether channel i is currently in the set X.
$x(i)=0$ if channel i is not in the set X, and 1 if it is.

VII. Let data structure $y(i)$ indicate whether channel i is currently in the set Y.
$y(i)=0$ if channel i is not in the set Y, and 1 if it is.
Some properties of $x(i)$ and $y(i)$:
$x(i)=1 \Rightarrow y(i)=1$ (since $X \subseteq Y$), and the channel i is in set X.
$y(i)=\Rightarrow x(i)=0$ (since $X \subseteq Y$), and the channel i is in set (Z-Y).
If $y(i)=1$ and $x(i)=0$, then channel i is in set (Y-X).

This exemplary scenario can use the data structures as follows:

1. Assume set X is at the most half the size of set Y (note: ½ is an exemplary value) in terms of total BW of all channels in a set as opposed to the number of channels in a set.
2. Record minute statistics m (see step 902 in FIG. 9).
3. Determine if it is the end of a minute (see step 904 in FIG. 9).
4. At end of each minute, update $m(i,60)$, compute and sort $h(i)$ and left-shift $m(i,j)$ (see step 906 in FIG. 9). Then, determine the list of TV channels to put in set (Y-X) as follows (see step 908 in FIG. 9):
Let the total BW of set Y be initialized to the "previous" total BW used by set X, and set the pointer to the highest channel, say $h(i)$ and:
If $x(i)=0$ (i.e. channel i is not already in set X), and total BW of set $Y\leq N$ Mbps, then: let $y(i)=1$ (i.e. put the channel in set (Y-X)), and increment total BW of set Y.
Advance pointer to next highest channel $h(i)$.
Loop Until total BW of set Y=N Mbps.
5. If it is the end of a primetime hour, then update $w(i,d,t-1,6)$ (see steps 910 and 912 in FIG. 9).
6. If this is the start of a primetime hour, then determine the list of TV channels to put in set X as follows (see steps 914 and 916 in FIG. 9):
Set pointer to highest channel click count, say $H(i,d,t)$, and
If $x(i)=0$ (i.e. channel i is not already in set X), and total BW of set $X\leq N/2$ Mbps.
Then let $x(i)=1$ (i.e. put the channel in set X), and increment total BW of set X.
Advance pointer to next highest channel click count $H(i,d,t)$.
Loop Until total BW of set X=N/2 Mbps.
If total BW of set Y is now >N Mbps, then drop the least clicked on channels in set Y until the BW of set Y=N Mbps.
7. If this is the start of a new week, then update and sort $H(i,d,t)$ and left-shift $w(i,d,t,j)$ (see steps 918 and 920 in FIG. 9).

From the foregoing, it can be seen that the enhanced BTV server 310 is able to collect and store information about TV channel clicking in different data structures and then analyze those data structures in different ways to select and store the "right" TV channels 311a. It should also be appreciated that the enhanced BTV server 310 can within the scope of the present invention also collect TV channel clicking statistics using data structures that were not described herein and then analyze those data structures in different ways that were not described herein to select the "right" TV channels 311a. Moreover, it should be appreciated that the streaming media described herein is TV channels but it could also be audio media and non-video forms of visual media.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

Figure 8:
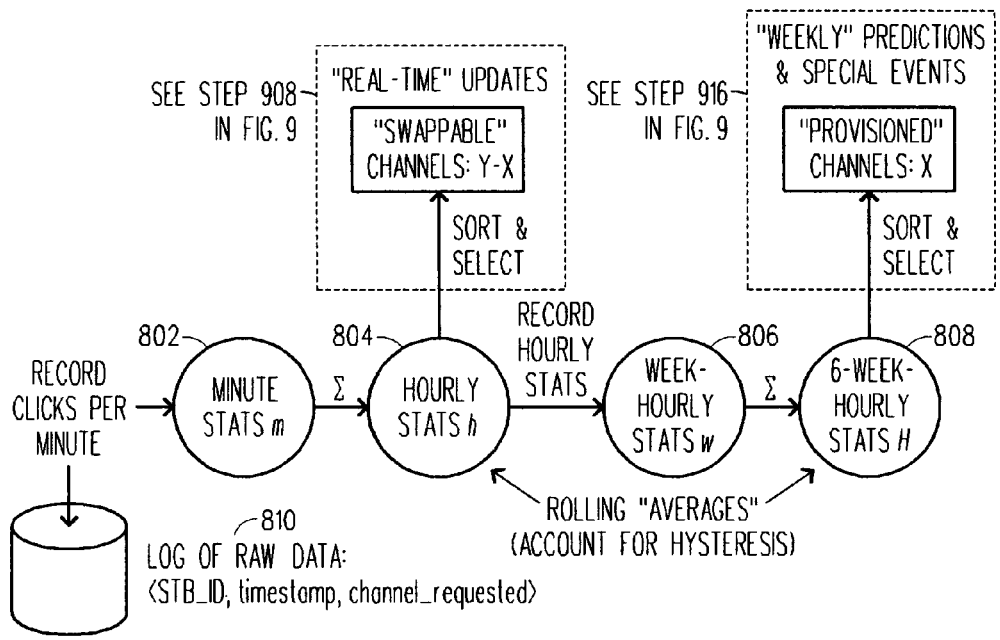
FIG. 8 is a diagram illustrating how various TV channel clicking statistics/data structures can be generated and used by the enhanced rapid TV channel change functionality (enhanced BTV server) in accordance with a second scenario of the present invention.
Figure 9:
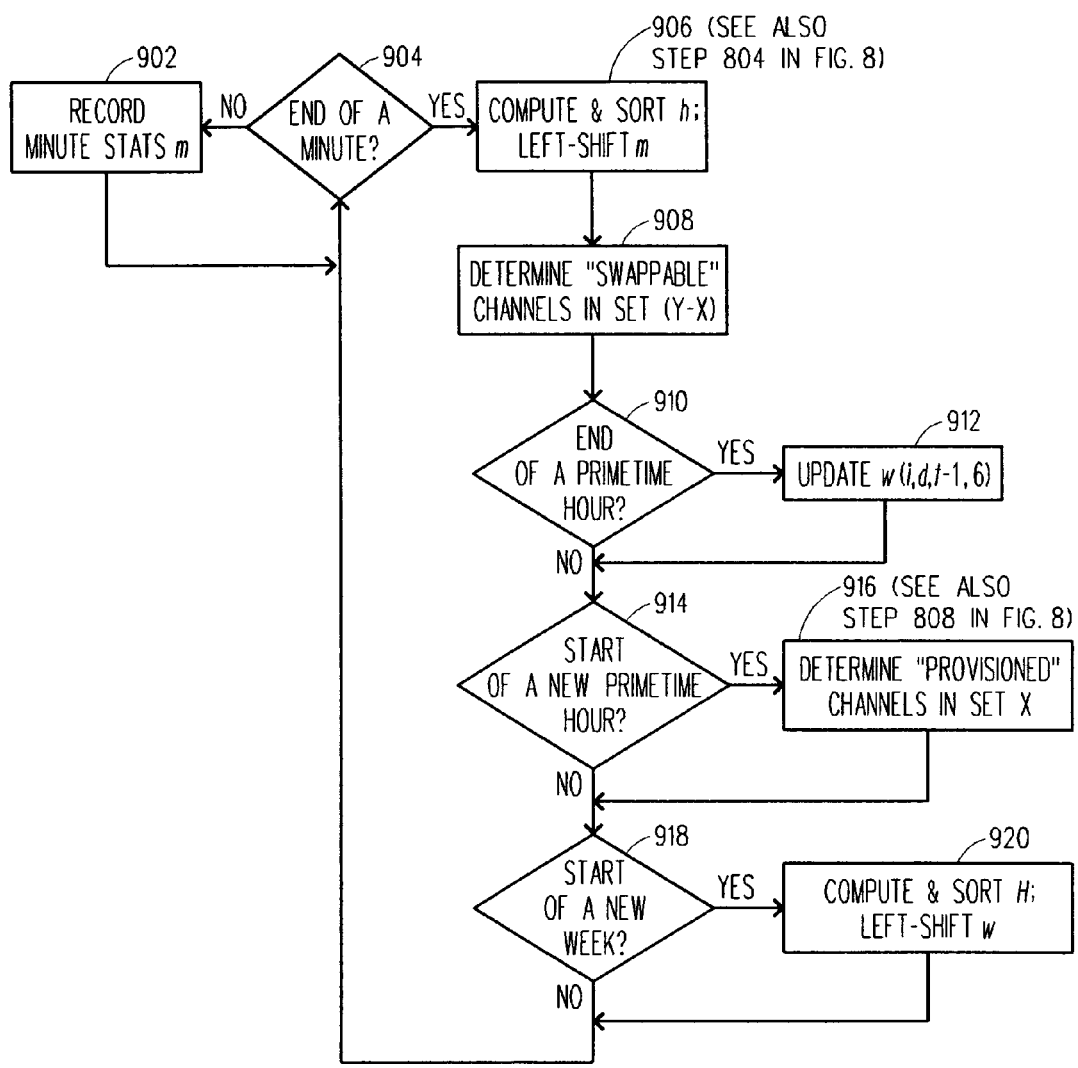
FIG. 9 is a flowchart illustrating an exemplary method that can be implemented by the enhanced rapid TV channel change functionality (enhanced BTV server) in accordance with the second scenario of the present invention.

For example, an additional feature of the present invention is associated with the maintaining of a log that relates to TV channel change requests (see step 810 in FIG. 8). For instance, each time a TV channel change request 307 is made, the following tuple could be recorded: <STB_ID, timestamp, channel_requested>. The STB_ID can be an IP/MAC/any unique address of the STB 308 that made the TV channel change request 307. And, the timestamp could have granularity of seconds (e.g. Jun. 15, 2005, 18:25:33). A carrier would be very interested in obtaining this information since it provides real time demographic channel watching behavior that is more detailed than Nielsen ratings. For example, the carrier could sell this information to potential advertisers who could then target not only cities (as is possible today with Nielsen ratings) but also specific neighborhoods in those cities (not possible with Nielsen ratings).

What is claimed is:

1. A method for providing broadcast TV channels from an access node to a plurality of decoders, said method comprising:
   multicasting the TV channels to the decoders from the access node;
   determining, during a sliding time period, statistics of how many times each multicast TV channel was activated by the plurality of decoders at the access node;
   listing the multicast TV channels in an ordered list in an order based on the number of activations;
   identifying one or more provisioned TV channels from the ordered list and adding one or more of the identified TV channels to a set of locally served TV channels;
   computing the bandwidth consumed by the added, identified provisioned TV channels;
   adding an additional swappable TV channel, not previously identified and associated with the statistics of the highest number of activations, from the ordered list to the set of locally served TV channels;
   computing a total bandwidth consumed by the additional swappable TV channel and the provisioned TV channels;
   repeating said adding and computing steps until the computed total bandwidth reaches a predetermined bandwidth threshold;
   storing the set of locally served TV channels at the access node;
   dynamically changing the set of locally served TV channels stored at the access node by changing the provisioned TV channels using the statistics collected over a long time period and changing the swappable TV channels using the statistics collected over a short time period; and
   upon receiving a TV channel request associated with a selected TV channel within the stored set of locally served TV channels from one of the plurality of decoders, unicasting the selected TV channel to said one of the plurality of decoders.

2. The method of claim 1, wherein said ordered list of TV channels comprises SD TV channels and HD TV channels.

3. The method of claim 1, further comprising collecting data during the sliding time period, and organizing the collected data using one or more data structures.

4. The method of claim 3, wherein the one or more data structures include comprises at least one of the following:
   a minute data structure;
   a hour data structure;
   a primetime hour data structure; and
   an averaged primetime hour data structure.

5. The method of claim 1, wherein the provisioned TV channels comprise manually provisioned TV channels and automatically provisioned TV channels.

6. The method as in claim 1 further comprising:
   storing the TV channel request;
   organizing a data log for the TV channel request that includes:
      a set-top box (STB) identification;
      a timestamp; and
      a TV channel requested, wherein said STB identification is a unique address associated with the decoder which made the TV channel change request; and
   forwarding a plurality of the data logs to an advertiser.

7. The method of claim 6, further comprising targeting a specific commercial to a specific neighborhood within a city using the plurality of data logs.

8. An access node for carrying out an enhanced rapid TV channel change functionality, said access node comprising:
   a processor;
   a buffer;
   a memory;
   instructions accessible from said memory and processable by said processor, wherein said instructions are configured for enabling said processor to facilitate:
      receiving multicast TV channels from a video-head end;
      forwarding the multicast TV channels to set-top boxes (STBs);
      determining, during a sliding time period, statistics of how many times each of the multicast TV channels was activated by STBs;
      listing the multicast TV channels in an ordered list in an order based on the statistics of the number of activations;
      identifying one or more provisioned TV channels from the ordered list and adding one or more of the identified provisioned TV channels to a set of locally served TV channels;
      computing the bandwidth consumed by the added, identified provisioned TV channels;
      adding an additional swappable TV channel, not previously identified and associated with the statistics of the highest number of activations, from the ordered list to the set of TV channels;
      computing a bandwidth consumed by the additional swappable TV channel and the provisioned TV channels;
      repeating said adding and computing steps until the computed bandwidth reaches a predetermined bandwidth threshold;
      storing the set of locally served TV channels in the buffer;

dynamically changing the stored set of locally served TV channels by changing the provisioned TV channels using the statistics collected over a long time period and changing the swappable TV channels using the statistics collected over a short time period;

receiving a TV channel change request from one of the STBs;

determining if a TV channel associated with the TV channel change request is stored in the buffer;

in response to a determination that the TV channel associated with the TV channel change request is stored in the buffer, then unicasting the requested TV channel to the one STB; and in response to a determination that the TV channel associated with the TV channel change request is not stored in the buffer, then forwarding the TV channel change request to the video-head end which has its own rapid TV channel change functionality that unicasts the requested TV channel to the one STB.

9. The access node of claim 8, wherein said provisioned TV channels comprise manually provisioned TV channels and automatically provisioned TV channels.

10. The access node of claim 8, wherein said instructions are further configured for enabling said processor to facilitate collecting data during the sliding time period, and organizing the collected data using one or more data structures.

* * * * *